US010585681B2

(12) United States Patent
Bhamidipati et al.

(10) Patent No.: US 10,585,681 B2
(45) Date of Patent: Mar. 10, 2020

(54) SELF-LEARNING USER INTERFACE

(71) Applicant: Microsoft Technology Licensing, LLC, Redmond, WA (US)

(72) Inventors: Venkata S. J. R. Bhamidipati, Fremont, CA (US); Alexander Easton, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 15/335,282

(22) Filed: Oct. 26, 2016

(65) Prior Publication Data

US 2018/0113718 A1    Apr. 26, 2018

(51) Int. Cl.
| | |
|---|---|
| G06F 9/451 | (2018.01) |
| H04L 29/08 | (2006.01) |
| H04L 29/06 | (2006.01) |
| G06Q 10/06 | (2012.01) |
| G06Q 10/10 | (2012.01) |
| G06F 9/445 | (2018.01) |
| G06F 3/0484 | (2013.01) |
| G06F 17/00 | (2019.01) |

(52) U.S. Cl.
CPC ....... *G06F 9/451* (2018.02); *G06Q 10/06311* (2013.01); *G06Q 10/103* (2013.01); *H04L 65/1083* (2013.01); *H04L 67/18* (2013.01); *H04L 67/22* (2013.01); *H04L 67/306* (2013.01); *G06F 3/0484* (2013.01); *G06F 9/44505* (2013.01); *G06Q 10/10* (2013.01); *H04L 67/1095* (2013.01); *H04L 67/42* (2013.01)

(58) Field of Classification Search
CPC .... G06Q 30/02; G06Q 10/10; H04L 67/1095; H04L 67/42; G06F 17/248; G06F 17/30011; G06F 17/30864; G06F 17/30867; G06F 3/0484
See application file for complete search history.

(56) References Cited

U.S. PATENT DOCUMENTS

| | | | |
|---|---|---|---|
| 9,419,868 B1 * | 8/2016 | Koerner | H04L 67/22 |
| 2013/0185240 A1 * | 7/2013 | Ward | G06F 8/34 |
| | | | 706/47 |
| 2014/0337071 A1 * | 11/2014 | Stiffler | G06Q 10/06311 |
| | | | 705/7.13 |
| 2016/0255139 A1 * | 9/2016 | Rathod | G06F 16/9535 |
| | | | 709/203 |

* cited by examiner

*Primary Examiner* — Quoc A Tran
(74) *Attorney, Agent, or Firm* — Hickman Palermo Becker Bingham LLP (57) ABSTRACT

A method and apparatus for a self-learning user interface is provided. The method comprises receiving selection data that indicates a first plurality of user selections with respect to a first plurality of views of a workflow associated with a task; receiving an instruction to initiate a current session of the workflow; accessing the selection data and one or more models of user behavior generated from a second plurality of user selections associated with a plurality of users; determining a plurality of elements that were not selected by the user; determining to remove at least one of the first plurality of views of the workflow or a subset of the plurality of elements; generating a second plurality of views of web content for the user by excluding the removed at least one of the first plurality of views of the workflow or the removed subset of the plurality of elements.

20 Claims, 7 Drawing Sheets

SELF-LEARNING USER INTERFACE

TECHNOLOGICAL FIELD

The present disclosure relates to network communications and, more specifically, to an improvement in generation of web-based user interfaces within a web application of mobile application. SUGGESTED ART UNIT: 2611.

BACKGROUND

Web applications and mobile applications are used in Internet-based communications between computers. A web application may be executed by a web browser program on a computer to perform a particular task. A mobile application is a stand-alone application executed on a mobile device, such as a smartphone or tablet.

These applications may include views that, in turn, comprise one or more forms, menus, or dashboards for presenting information to a user and receiving information from a user. Because of the number of user interface elements in the views, the views may appear cluttered or be difficult for a user to navigate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

User interfaces in web-based applications can become crowded with features, menus, graphics, forms, and other elements. The user of the applications can be overwhelmed by the sheer number of elements included in the user interface. For example, an application for managing Internet content delivery campaigns can have multiple accounts, multiple campaigns, and, within each campaign, various menus for billing, targeting particular audiences, selecting content and content type, and measuring the performance of the content delivery campaign.

Within the application, a workflow to perform a task is presented to the user. The workflow is a user interface comprising a number of views that may be provided in sequence. Within each view of the workflow, one or more sub-tasks may be performed. The view of the workflow includes a plurality of user interface elements including menus, forms, graphics, text, and the like.

Any given user of the application may perform a limited number of operations with the application. For example, a marketing executive may bypass user views or elements pertaining to billing while repeatedly accessing the performance data of an advertising campaign. In contrast, a bookkeeper may access billing information while bypassing other elements in the user interface.

A self-learning user interface is provided herein. In a self-learning user interface, the prior actions of a particular user within the application are recorded and stored. Using a model, such as a heuristic model or machine learning model, the actions of the users are analyzed to determine what the user typically does within the application. These actions may include records of what the user does not do as well. The model and the recorded actions of the user are used to generate a new user interface that has some elements removed. In some instances, the improved user interface may be part of a revised workflow having a different number of views than the unimproved workflow. In some instances, a default view may be changed to a different view, a new view may be generated that includes elements from various views in the unimproved workflow, or a view may have one or more interface elements removed.

System Overview

Figure 1:
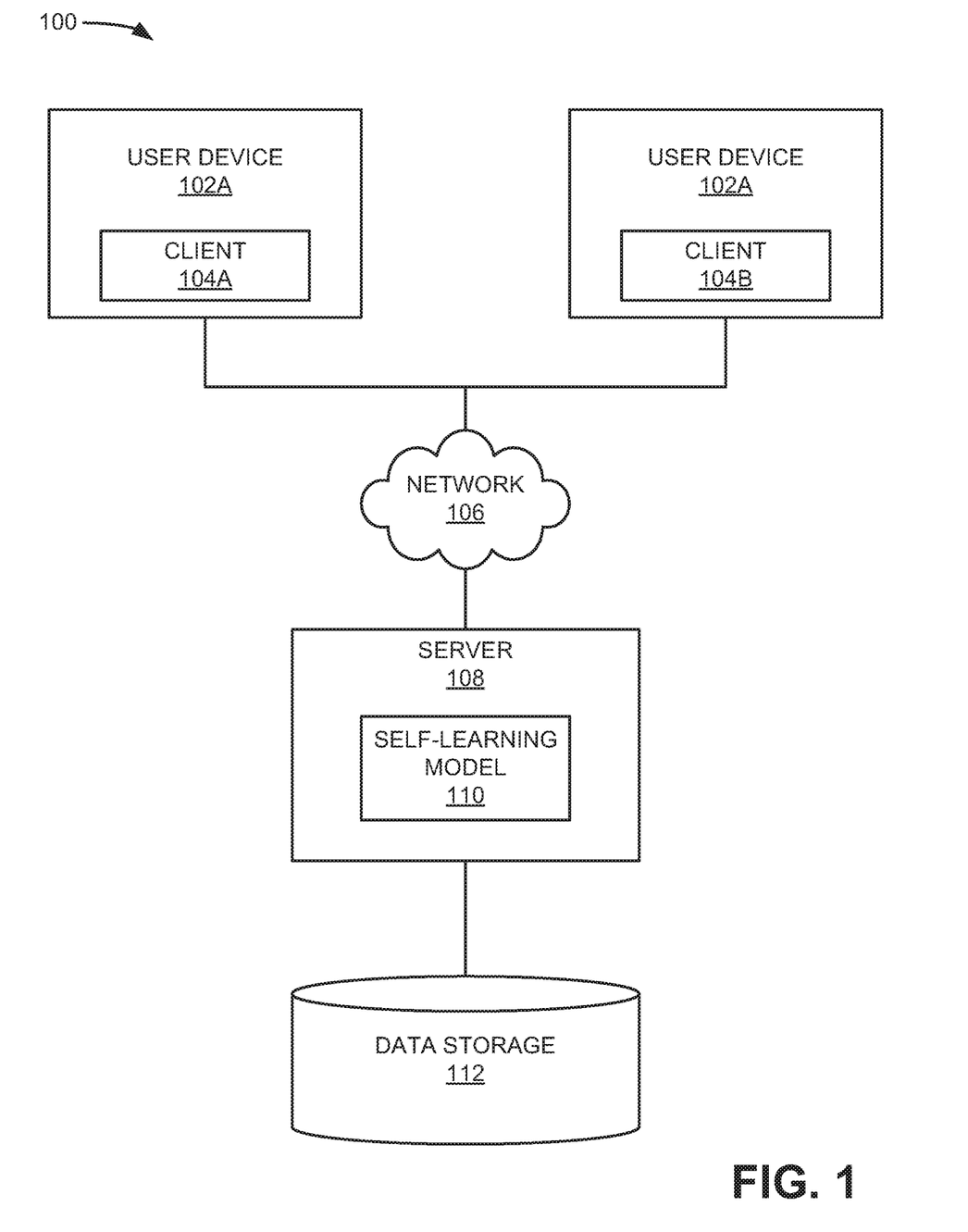
FIG. 1 is block diagram of a system in which various embodiments may be practiced.

FIG. 1 is block diagram of a system 100 in which various embodiments may be practiced. The system 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes one or more user devices 102A and 102B running clients 104A and 104B, a network 106, a server 108, and data storage 112. Each of the user devices 102A and 102B, server 108, and data storage 112 is in wired or wireless communication with the network 106.

User devices 102A, 102B comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the user devices 102A, 102B includes clients 104A, 104B. Clients 104A, 104B include, but are not limited to, applications such as a web browser, software, and/or other executable instructions to facilitate various aspects of the techniques described herein. User devices 102A, 102B may also include additional applications or other interface capabilities to communicate with the server 108 and/or data storage 114. User devices 102A, 102B may, depending on the embodiment, be located geographically dispersed from each other. Although two user devices 102A, 102B are shown in FIG. 1, more or less than two user devices 102A, 102B may be included in system 100.

Network 106 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 106 comprises a public network, security features (e.g., VPN/SSL secure transport) may be included to ensure authorized access within system 100.

Server 108 comprises one or more servers, computers, processors, database servers, and/or computing devices configured to communicate with the data storage 112 and/or user devices 102A, 102B via network 106. Server 108 hosts one or more applications, websites, social networks, or other visual or user interface mechanisms related to techniques and data described in detail below. Server 108 may be located at one or more geographically distributed locations. Although one server 108 is shown in FIG. 1, system 100 may, depending on the embodiment, comprise one, two, or any number of servers 108, which may work alone and/or collectively to provide the functionality described herein.

The server 108 comprises self-learning model 110. The self-learning model 110 is a computer model that receives data about the user and data describing the user's past interactions with a user interface including a workflow or series of views. The self-learning model 110 uses one or more analysis techniques to modify the workflow by removing one or more elements from the views in the series of views. The analysis techniques are described further below and include a heuristic model and machine learning techniques. In some instances, the workflow may be modified by adding, combining, or removing views.

Data storage 112 comprises one or more databases or storage devices configured to store and maintain user profiles, data associated with user profiles, data associated with use of or access to user profiles, data derived from user profiles, and/or instructions for use by server 108 and/or clients 104A, 104B as described herein. Data storage 112 may, in some embodiments, be located at one or more geographically-distributed locations relative to server 108. Server 108 and/or clients 104A, 104B may, in some embodiments, access data storage 112 via network 106. Alternatively, server 108 may access data storage 112 without use of network 106. As another alternative, data storage 112 may be included within server 108. System 100 may, depending on the embodiment, comprise one, two, or any number of data storages 112 configured to individually and/or collectively store the data described herein.

Generating a Self-Learning User Interface

Figure 2:
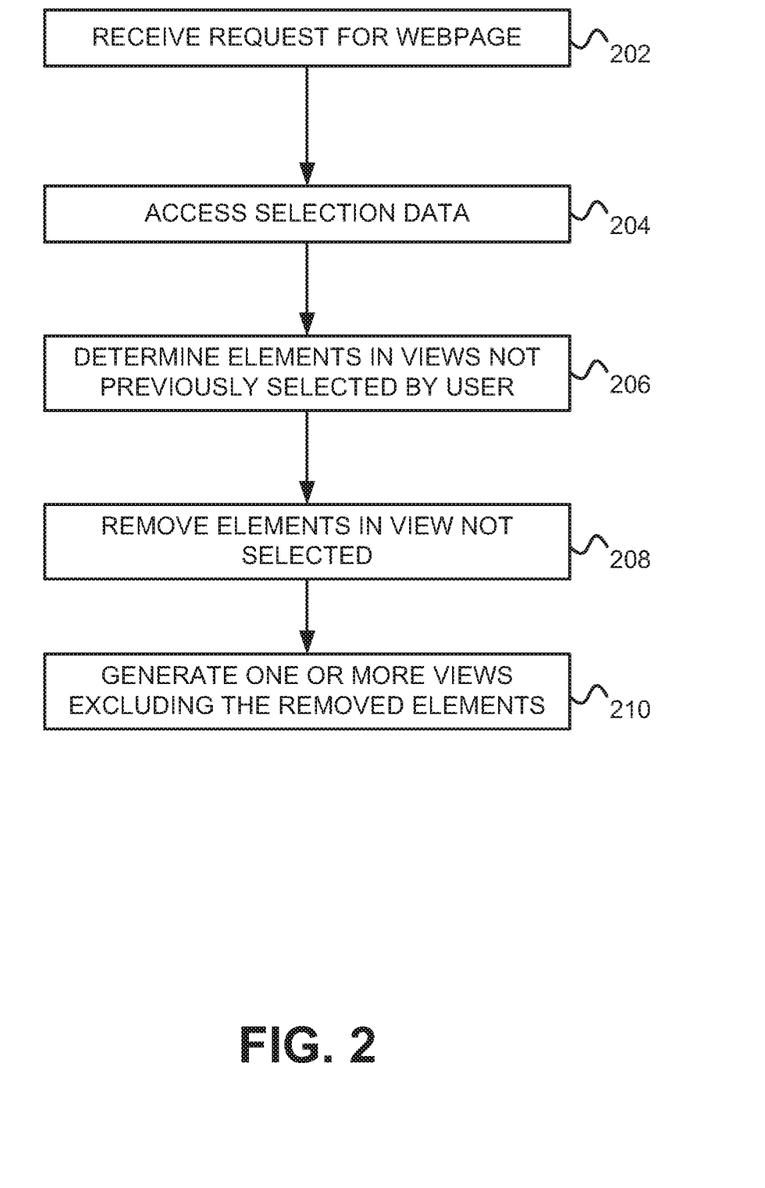
FIG. 2 is a flow chart of a method for generating a self-learning user interface, according to various embodiments.

FIG. 2 is a flow chart of a method 200 for generating a self-learning user interface, according to various embodiments. The method 200 can be performed by the server 108. The method 200 facilitates the provision of an improved user interface that is customized to the user based on the user's (and/or one or more other users') past interactions with the user interface. The provision of the improved user interface may reduce the amount of data communicated from the server 108 to the clients 104A, 104B. The improved user interface may reduce the number of calls from server 208 to data storage 112, which is a computationally expensive process, possibly resulting in better performance of server 108.

In an operation 202, the server 208 receives a request for a webpage from client 104A, 104B. The webpage may correspond to a webpage that hosts a web application. In a mobile application on client device 102A, 102B, the request of operation 202 may be opening and executing the mobile application. The request may include data including, but not limited to, geographical location, time of day, user identifier, organization identifier, and role within an organization. A request initiates a session with the user interface. A session, as used herein, is a continuous period of time during which the user interacts with the user interface. A session may end based on elapse of a time-out period, a user logging out of the user interface, or another action or non-action that causes the session to end.

In an operation 204, the server 208 accesses selection data associated with the user. The selection data is stored in data storage 112. The selection data may comprise a record of the user's actions, data about the user including a role of the user, and/or records of other users' actions who have a similar role to that of the user.

The server 108 or another computer records the actions of the user when using the workflow or user interface. The actions may be recorded as the user interacts with an unimproved user interface or an improved user interface. The actions may include which account or campaign that a user selects. Each user is associated with one or more accounts. Each account, in turn, may be associated with one or more campaigns. To illustrate, for example, an account for managing online content delivery may be associated with one or more content delivery campaigns. Another action of the user that may be recorded includes selections by the user of one or more options included in the user interface. The options may be presented as part of an electronic form, a menu, a dashboard, or other user interface elements. In some embodiments, the recorded action may include a value or other data that is entered into fields associated with an electronic form.

In some instances, data about the user's actions may be recorded. This data may include an amount of time spent by the user at a particular view within the user interface. The data may further include certain actions, such as scrolling, hovering over a particular interface element, mouse or cursor movements, and the like. Other data may include data describing a current context of the user. The current context of the user includes, but is not limited to: geographic location; user device; type of user device such as smartphone, tablet, or laptop computer; time of day; day of the week; and the like.

In an operation 206, the self-learning model 110 within the server 108 determines elements in the views associated with the user interface that are used or not used by the user. The determination may include a determination that the user, or other users who have a role that is similar to that of the user, has not requested certain views or has not interacted with certain user interface elements.

In some instances, the determination may include identifying interface elements that the user interacts with in association with a particular account or with a particular campaign associated with the user. For example, when a user logs in to a first account and accesses a first campaign, the user may habitually access a particular set of user interface elements. When the same user logs in to the first account and accesses a second campaign, the user may access a different set of user interface elements. This behavior is recorded in the data storage 112. As part of making the determination of the operation 206, either the particular set of user interface elements or the different set of user interface elements may be identified based on whether the user has selected the first campaign or the second campaign, respectively.

In some embodiments, the determination of the operation 206 may include a determination made based on the current context of the user. If the current context of the user matches, or is similar to, a previous context of the user during which the user's actions were recorded, the current context may be used to identify which user interface elements have or have not been previously selected by the user. For example, if a user has previously sent a request during business hours on a weekday from a laptop or desktop computer and selected a first account and a first campaign, and the current request is received during business hours on a weekday from the same computer, the determination of operation 206 may include a determination that the other accounts or content delivery campaigns were not selected by the user. Further, a single user may be associated with multiple contexts, each context being associated with a different set of user interface elements and/or views.

In an operation 208, the self-learning model 110 removes elements that were determined to not be selected in the operation 206 from the workflow or user interface. The self-learning model 110 may remove the elements by, for example, moving elements from a location above the fold to below the fold or to another location or another view, moving elements to a hidden tab in the view, greying out elements, moving elements to an expanding menu that is shown collapsed by default, or other user interface elements that may hide other user interface elements. Thus, a user interface element may be added to a "learned" user interface that did not exist in the normal or "unlearned" user interface.

In some embodiments, the self-learning model 110 may remove or modify views from the workflow. If a user has not previously selected a view or has spent a relatively short length of time before navigating from a view, then the self-learning model 110 may remove the view from the workflow. In some cases, the view removed may be a view from which a user may select an account and/or campaign. The self-learning model 110 may further create new views by identifying elements from disparate views in the user interface and re-arranging the elements in a new view in the improved user interface. The elements from disparate views may be identified from views for which the user does not interact with other elements in the views.

The self-learning model 110 may perform the removal of the elements using one or more techniques. Possible techniques include machine learning such as decision tree learning, association rule learning, artificial neural networks, deep learning, inductive logic programming, support vector machines, clustering, Bayesian networks, reinforcement learning, representation learning, similarity and metric learning, sparse dictionary learning, and genetic algorithms. The features on which these techniques may be used include attributes of the user such as role or job title, context of the user during previous sessions, and the like. Attributes of the user may be accessed from, for example, a user's online social media profile.

Some embodiments use a heuristic model as the self-learning model 110. Some example heuristics are listed in TABLE 1:

TABLE 1

| CONDITION | ACTION |
| --- | --- |
| <user> selected <element> during <number> previous sessions | Include element in UI |
| <userrole> selected <element> during <percentage> of previous sessions | Include element in UI |
| <usercontext> matches <currentcontext> | Select UI associated with current context |
| <user> expanded <removedelement> during <number> previous sessions | Include element in UI |
| <user> accessed <account.campaign> during <number> previous sessions | Select UI associated with campaign |
| <userrole> matches <userrole> | Select UI associated with user role |
| <user> did not select <element> during <number> previous sessions | Remove element from UI |
| <user> selected <Sponsored Updates button> during <10> previous sessions when presented with <Text Ads button> and <Sponsored Updated button> | Immediately present Sponsored Update flow with a Back Button to navigate to the selector |
| <user> did not tab through to <billing> during <10> previous sessions | Do not pre-load the data in the billing tab |
| <user> deselected <show only inside LinkedIn feed> during <5> previous sessions | Pre-deselect in the UI |
| <user> expanded <targeting.geo.north america> during <5> previous campaign create/edit flows | Expand that targeting facet when user lands on targeting tab/page |
| <user> collapsed <targeting.geo.australia> during <5> previous campaign create/edit flows | Collapse targeting facet when user lands on targeting tab/page |
| <user> expanded <targeting.field of study> during <5> previous campaign create/edit flows | Expand targeting facet when user lands on targeting tab/page |
| <user> accessed <reporting.clicks> during <5> previous sessions while viewing campaign performance | Pre-select reporting.clicks as the metric when user lands on reporting tab/page |
| <user> did not access <reporting.timerange.all> during <5> previous sessions | remove reporting.timerange.all from visible set of time ranges when user lands on reporting tab/page |

In some instances, the self-learning model 110 may create heuristics automatically, without human intervention, using statistical, artificial intelligence, or machine learning techniques. In other instances, a developer may generate the heuristics. The self-learning model 110 may combine heuristics using Boolean operators to generate more complex rules.

In an operation 210, the self-learning model 110 generates one or more views in an improved user interface that excludes the removed elements. The generated views may include elements from other views in the unimproved interface. In the improved user interface, one or more views may be removed.

The improved interface may include an improved default view that is presented in response to receiving the request of operation 202. The default view may be improved by, for example, removing user interface elements associated with one or more accounts or campaigns that are associated with the user. The user interface elements may be removed based on a current context of the user including, for example, current time of day, type of user device, and geographic location of the user device.

The improved interface may comprise one or more user interface elements that, when selected by the user, allow the user to select removed interface elements. For example, a view in the original user interface may be accessed by selecting a tab element. Some removed interface elements may be positioned below the fold and are accessible by scrolling. In some instances, a menu or set of options may be collapsed in the improved user interface and later expanded by selecting an option to expand the menu or set of options. In some instances, a region of the improved user interface may be designated such that when a user hovers over the region, a pop-up window or dialog box appears. The pop-up window or dialog box may include one or more selectable options to access the removed user interface elements.

In some instances, the generated views of the operation 210 comprise electronic forms or portions thereof. In the improved user interface, some fields of the electronic form may be removed if the fields correspond to values that do not change frequently, such as an account number or payment information. The electronic forms may be pre-filled with one or more values. In some instances, the pre-filled values are determined based on the history of the user's actions. The pre-filled values may match values previously entered. In some embodiments, the pre-filled values may be determined based on the history of the user. To illustrate, if the user interface comprises a form having a bid value field and a minimum bid amount, and if the user has a history of entering the minimum bid amount, the form is pre-filled with the minimum bid amount.

Figure 3A:
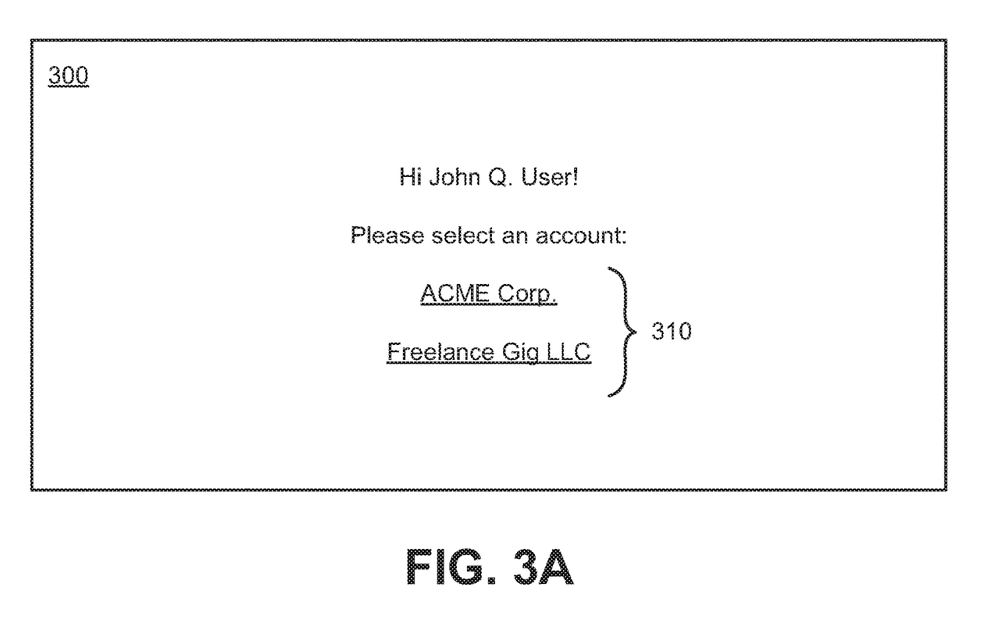
FIG. 3A and FIG. 3B depict portions of example unimproved user interfaces, according to various embodiments.
Figure 3B:
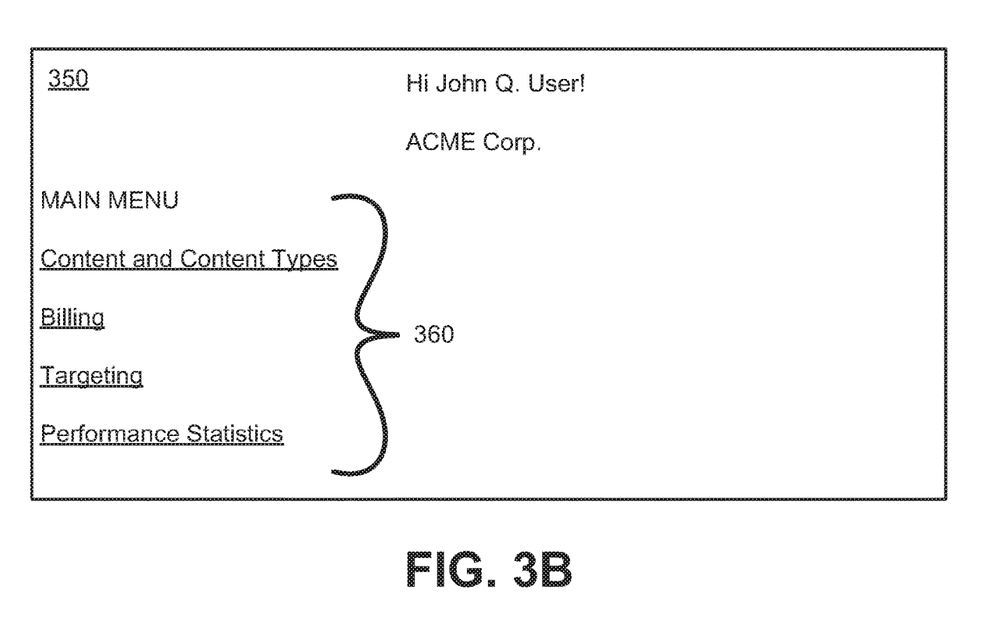

FIG. 3A and FIG. 3B depict portions of an example unimproved user interface, respectively, according to various embodiments. FIG. 3A depicts a first view 300 in an unimproved user interface that includes element 310 allowing a user to select an account: ACME Corp. or Freelance Gig LLC. FIG. 3B depicts a second view 350 (in the unimproved user interface) that is presented after the user selects ACME Corp. in the first view 300. The second view 350 comprises menu 360 from which a user can select "content and content types", "billing", "targeting", and "performance statistics".

Figure 4A:
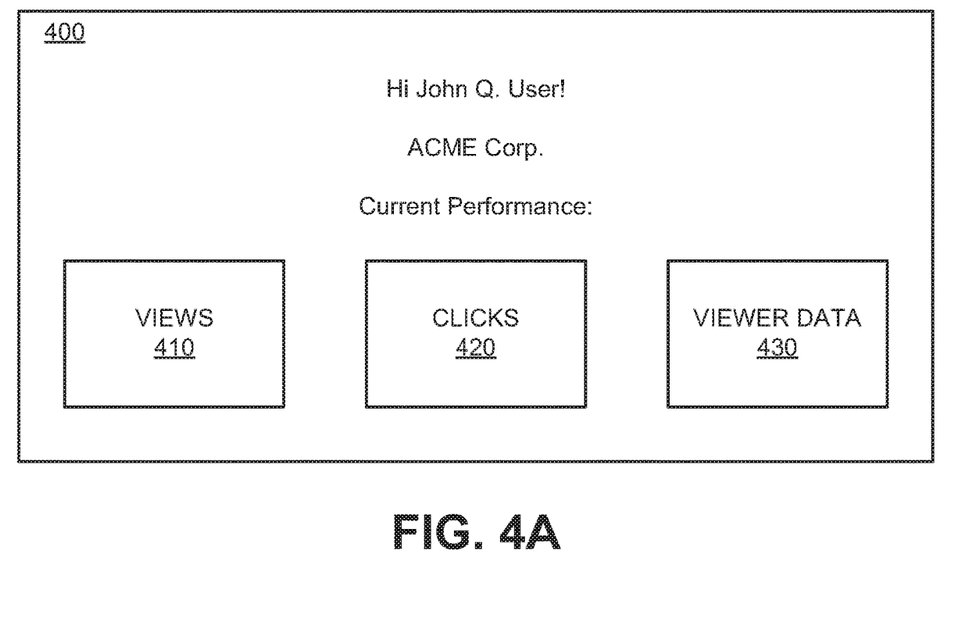
FIG. 4A and FIG. 4B depict portions of example unimproved user interfaces, according to various embodiments.
Figure 4B:
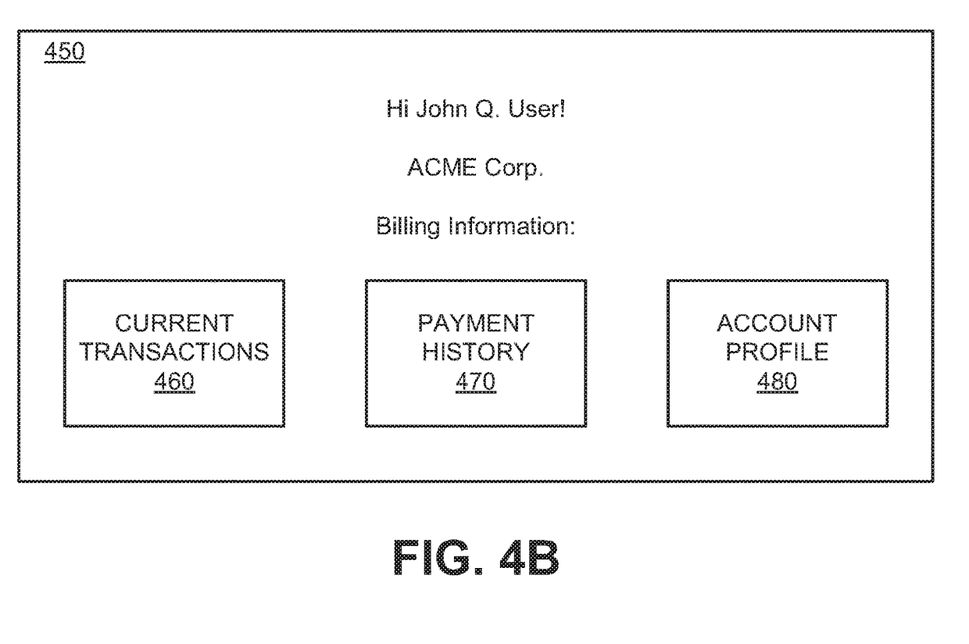

FIG. 4A and FIG. 4B depict portions of an example unimproved user interface, according to various embodiments. FIG. 4A depicts a third view 400 that is presented to the user in response to selection of "performance statistics" in menu 360 of second view 350. The third view 400 comprises three user interface elements: views 410, clicks 420, and viewer data 430. The user interface elements may include, for example, charts, graphs, graphics, video, audio, images, electronic forms, menus, and/or selectable options. FIG. 4B depicts a fourth view 450 that is presented to the user in response to selection of "billing" in menu 360 of second view 350. The fourth view 450 comprises three user interface elements: current transactions 460, payment history 470, and account profile 480. The user interface elements may include, for example, charts, graphs, graphics, video, audio, images, electronic forms, menus, and/or selectable options.

Figure 5:
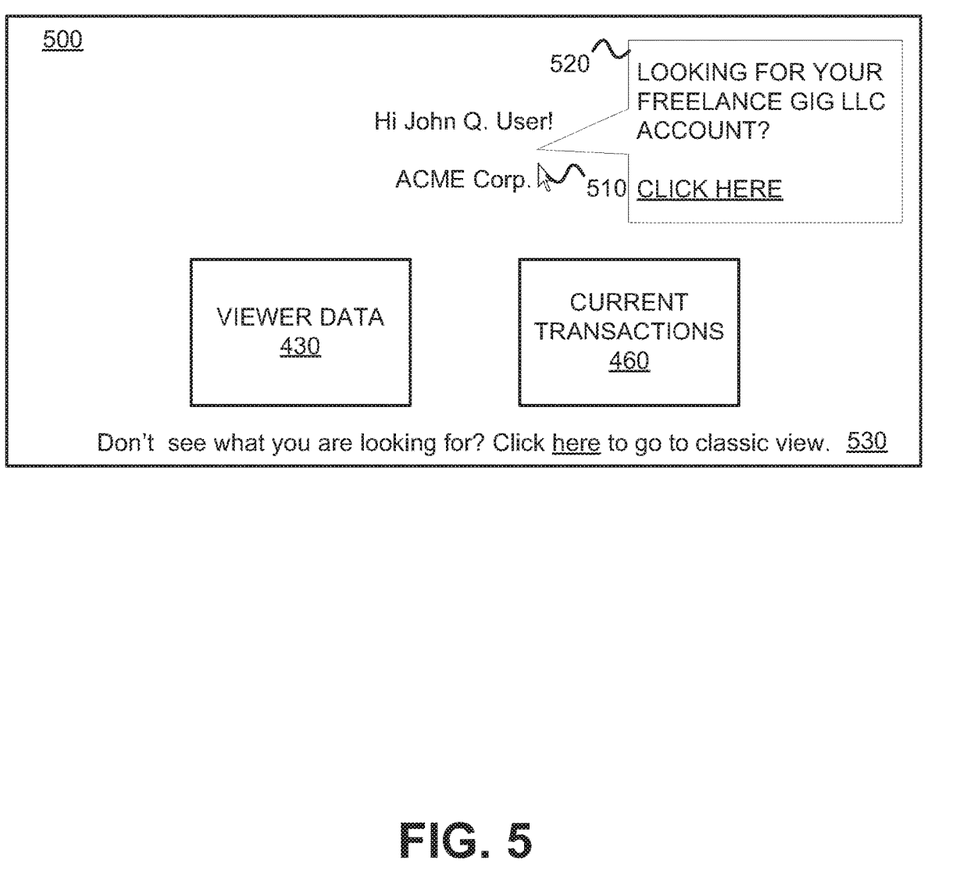
FIG. 5 depicts a portion of an example improved user interface, according to various embodiments.

FIG. 5 depicts a portion of an example improved user interface, according to various embodiments. A first improved view 500 depicts an improved default view provided in response to a request received as part of operation 202. The first improved view 500 includes text indicating that an account ACME Corp. was automatically selected based, for example, on a current context of the user.

The first improved view 500 further includes two user interface elements: viewer data 430 from third view 400 and current transactions 460 from fourth view 450. The user interface elements 430 and 460 may be the same as the interface elements in the unimproved user interface or may be modified using the method of FIG. 2. The modified interface elements may have one or more elements removed, one or more options pre-selected, or one or more pre-filled fields in electronic forms.

The first improved view 500 further includes user interface elements that allow a user to access removed elements or to navigate to other portions of the user interface. For example, when cursor 510 hovers over the account name "ACME Corp.", a pop-up window 520 is provided that includes instructions to switch to another account. The first improved view 500 further includes an option 530 to return to the unimproved user interface. When option 530 is selected, the unimproved user interface is provided.

Figure 6:
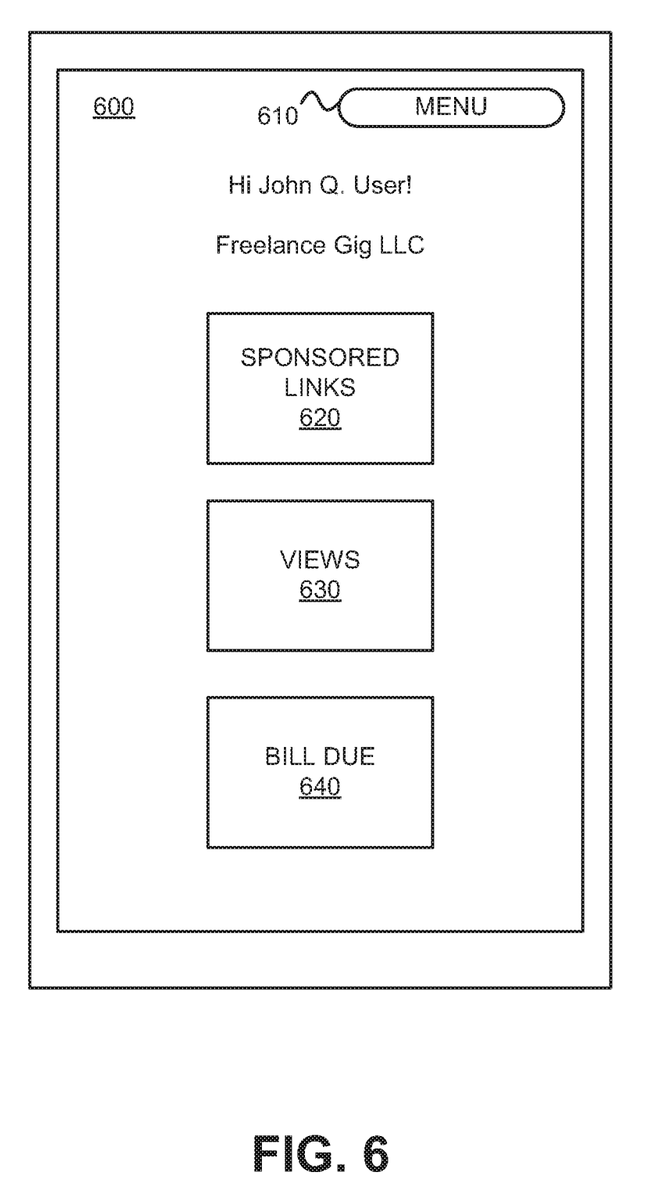
FIG. 6 depicts a portion of an example improved user interface, according to various embodiments.

FIG. 6 depicts a portion of an example improved user interface, according to various embodiments. A second improved view 600 is provided. The second improved view 600 is a user interface generated for a mobile device. The second improved view 600 depicts an improved default view provided in response to a request received as part of operation 202. The second improved view 600 includes text indicating that an account Freelance Gig LLC was automatically selected based, for example, on a current context of the user.

The second improved view 600 includes three user interface elements: sponsored links 620, views 630, and bill due 640. The user interface elements may be generated specifically for the mobile device interface from the data used to generate the unimproved user interface. Each of the user interface elements may be improved using the method of FIG. 2. The second improved view 600 includes menu button 610 that provides access to removed user interface elements.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
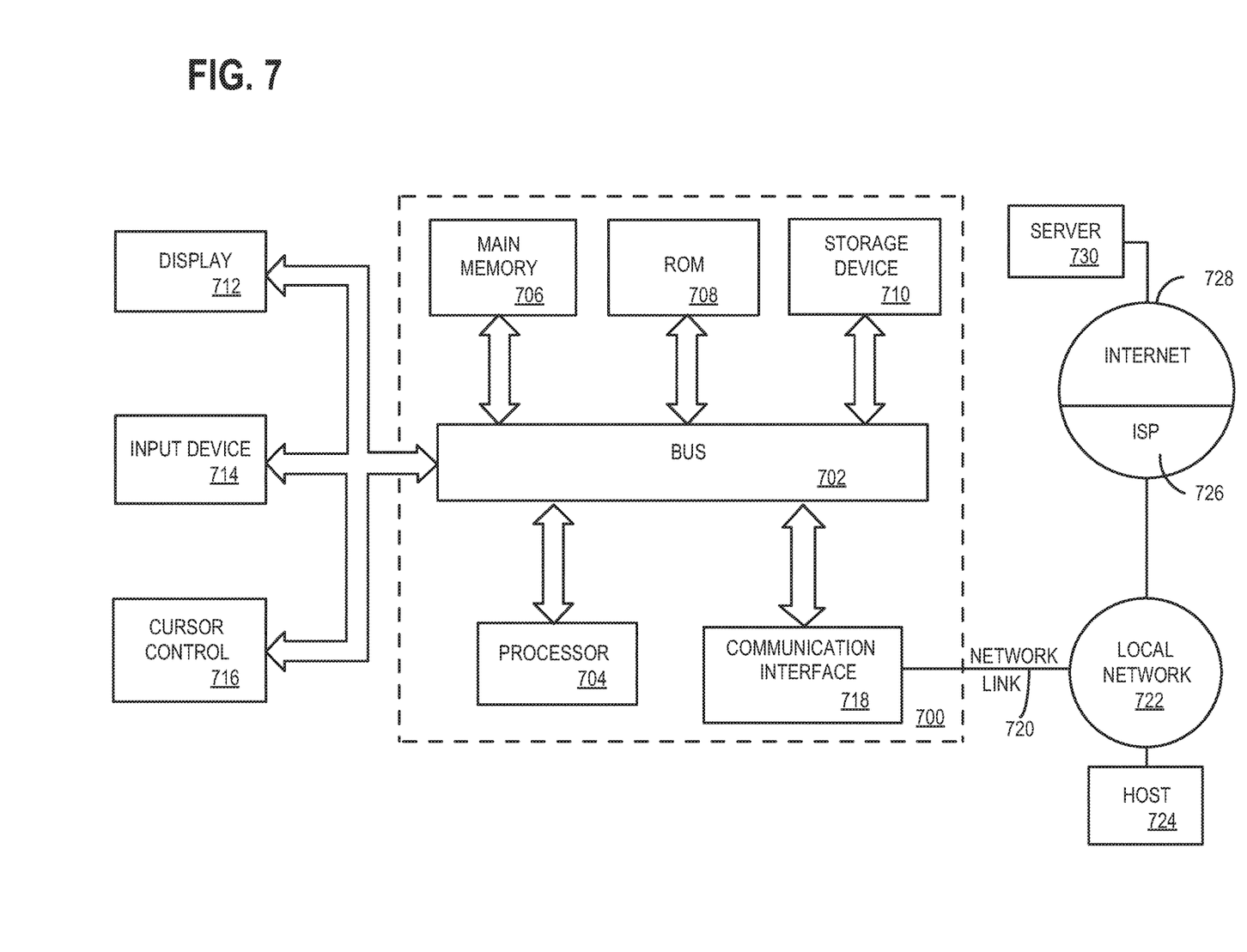
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    during one or more sessions with a service, receiving, from a computing device of a user, selection data that indicates a first plurality of user selections with respect to a first plurality of views of a workflow associated with a task;
    receiving, from the computing device of the user, an instruction to initiate a current session of the workflow;
    generating one or more models of user behavior based on past interactions with the workflow by a plurality of users;
    accessing, from a memory, the selection data and the one or more models of user behavior;
    determining, based on the selection data, a plurality of elements in the first plurality of views that were not selected by the user;
    determining, based on the one or more models of user behavior and the plurality of elements in the first plurality of views that were not selected by the user, to remove a subset of the first plurality of views of the workflow or a subset of the plurality of elements;
    during the current session with the service, generating a second plurality of views of web content for the user by excluding the removed subset of the first plurality of views of the workflow or the removed subset of the plurality of elements.

2. The method of claim 1, wherein the instruction to initiate the current session with the service comprises a current context of the user including a time of day, a geographical location of the user, or a description of the computing device of the user.

3. The method of claim 2, wherein determining the plurality of elements in the first plurality of views that were not selected by the user comprises determining the plurality of elements that were not selected by the user in a stored context that is similar to the current context.

4. The method of claim 1, wherein the plurality of users comprises users associated with a user role that matches a user role associated with the user.

5. The method of claim 1, wherein the one or more models of user behavior comprises a heuristic model.

6. The method of claim 1, wherein the subset of the first plurality of views is removed and comprises a default view.

7. The method of claim 1, wherein generating the second plurality of views of web content for the user comprises generating a new view comprising elements of the plurality of elements that were in different views in the first plurality of views of the workflow.

8. The method of claim 1, wherein generating the second plurality of views of web content for the user comprises generating a link included in the second plurality of views to the first plurality of views.

9. The method of claim 1, wherein generating the second plurality of views of web content for the user comprises generating an option to access the removed at least one of the first plurality of views of the workflow or the removed subset of the plurality of elements.

10. The method of claim 1, wherein generating the second plurality of views of web content for the user comprises pre-filling one or more fields in an electronic form.

11. The method of claim 1, wherein generating the second plurality of views of web content for the user comprises generating the second plurality of views for a mobile device.

12. A method comprising:
    during one or more sessions with a service, receiving, from a computing device of a user, selection data that indicates a first plurality of user selections with respect to a first user interface;
    receiving, from the computing device of the user, an instruction to initiate a current session of the first user interface;
    determining a current context of the user and a previous context of the user;
    in response to determining that the current context is similar to the previous context, determining, based on the selection data, a plurality of elements in the first user interface that were not selected by the user;
    determining, based on the plurality of elements in the first user interface that were not selected by the user, to remove a subset of the plurality of elements;
    during the current session with the service, generating a second user interface for the user by excluding the subset of the plurality of elements.

13. The method of claim 12, wherein the instruction to initiate the current session with the service comprises the current context of the user, wherein the current context includes one or more of a time of day, a geographical location of the user, or a description of the computing device of the user.

14. The method of claim 13, wherein determining the plurality of elements in the first user interface that were not selected by the user comprises determining the plurality of elements that were not selected by the user in the previous context.

15. The method of claim 12, wherein the user is associated with two or more accounts.

16. The method of claim 12, wherein generating the second user interface for the user comprises generating a link to the first user interface.

17. The method of claim 12, wherein generating the second user interface for the user comprises generating the second user interface for a mobile device.

18. The method of claim 12, wherein the subset of the plurality of elements comprises a default view.

19. The method of claim 18, wherein the default view is removed according to a determination of the current context of the user.

20. One or more non-transitory storage media storing instructions which, when executed by one or more processors, cause:
    during one or more sessions with a service, receiving, from a computing device of a user, selection data that indicates a first plurality of user selections with respect to a first user interface;
    receiving, from the computing device of the user, an instruction to initiate a current session of the first user interface;
    determining a current context of the user and a previous context of the user;

in response to determining that the current context is similar to the previous context, determining, based on the selection data, a plurality of elements in the first user interface that were not selected by the user;

determining, based on the plurality of elements in the first user interface that were not selected by the user, to remove a subset of the plurality of elements;

during the current session with the service, generating a second user interface for the user by excluding the removed subset of the plurality of elements.

\* \* \* \* \*